United States Patent [19]

Tierce et al.

[11] Patent Number: 5,635,685
[45] Date of Patent: Jun. 3, 1997

[54] ELECTROACOUSTIC TRANSDUCER WITH MECHANICAL IMPEDANCE TRANSFORMER

[75] Inventors: Pascal Tierce, Bondues; Jean Laurent, Morainvilliers, both of France

[73] Assignees: Institut Francais du Petrole, Rueil Malmaison; Compagnie Generale de Geophysique, Massy, both of France

[21] Appl. No.: 505,163
[22] PCT Filed: Dec. 9, 1994
[86] PCT No.: PCT/FR94/01436
  § 371 Date: Aug. 10, 1995
  § 102(e) Date: Aug. 10, 1995
[87] PCT Pub. No.: WO95/16211
  PCT Pub. Date: Jun. 15, 1995

[30] Foreign Application Priority Data

Dec. 10, 1993 [FR] France .................. 93 14966

[51] Int. Cl.⁶ .................................................. G01V 1/40
[52] U.S. Cl. ................................. 181/106; 367/912
[58] Field of Search .......................... 181/102–106; 367/25, 911, 912

[56] References Cited

U.S. PATENT DOCUMENTS

| | | | |
|---|---|---|---|
| 3,205,970 | 9/1965 | Holmes et al. | 181/106 |
| 4,960,181 | 10/1990 | Marin et al. | 181/106 |
| 5,069,308 | 12/1991 | Yin et al. | 181/106 |
| 5,109,946 | 5/1992 | Sorrells | 181/106 |

Primary Examiner—Khanh Dang
Attorney, Agent, or Firm—Antonelli, Terry, Stout & Kraus, LLP

[57] ABSTRACT

The transducer comprises for example a block (1) of sensitive elements such as piled piezoelectric disks held up by a stud bolt between two ferrules and a shell (8) all in one piece, that is arranged around the piling with a concave central part (8A) extended on either side by a solid cylindrical part (8 B, 8 C). Two sleeves are arranged at the two opposite ends of the transducer and elastic elements (14) for decoupling them in relation to the vibrating block (1) are interposed. A flexible housing (18) can be placed around the shell (8) so as to insulate from the outside environment the inner volume of the transducer that can be filled with a fluid such as oil. Connecting means allow the vibrating block to be connected to an exciting voltage source. The transducer can be used for the emission of vibrations at sea or in wells and notably petroleum or gas wells for example.

17 Claims, 2 Drawing Sheets

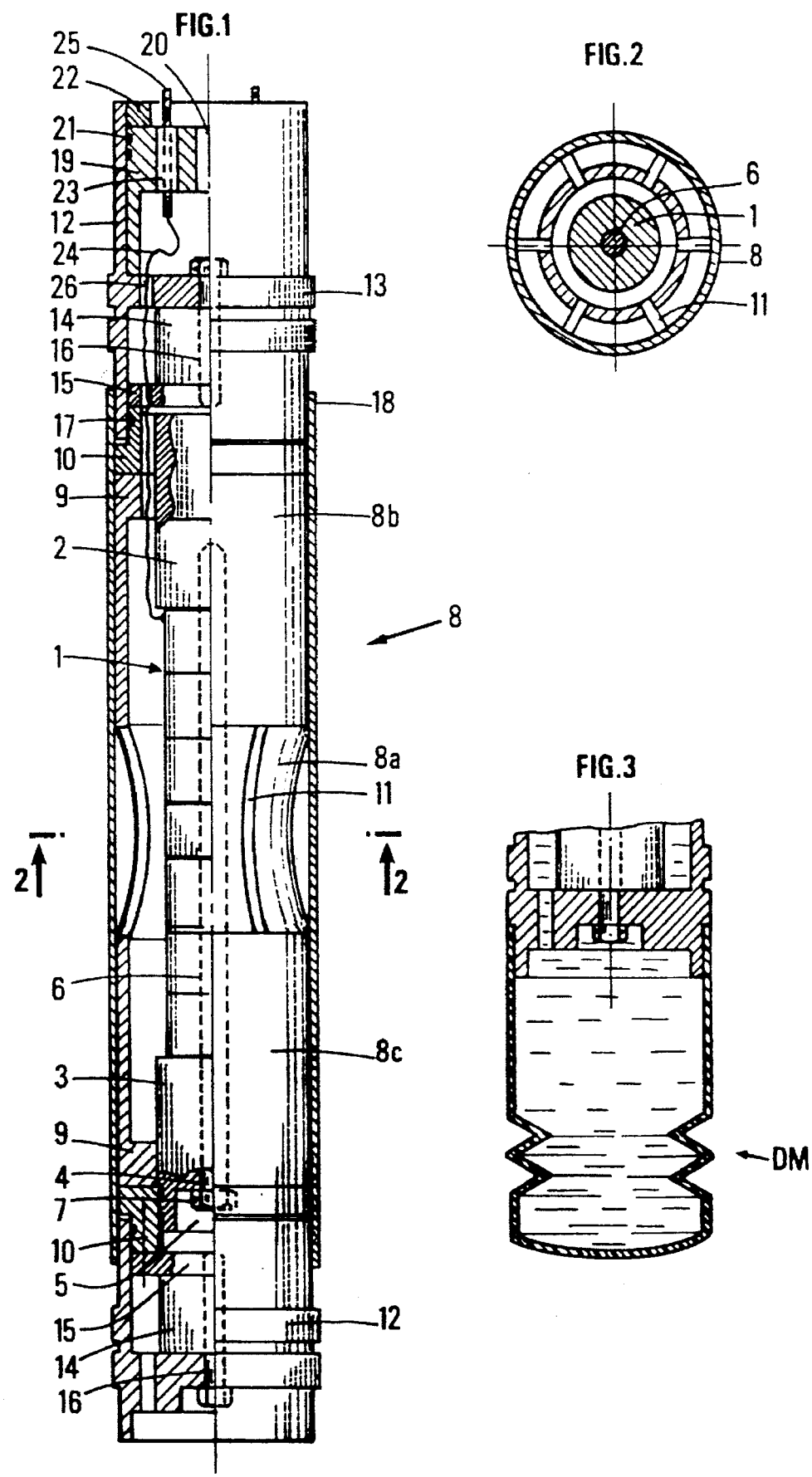

ELECTROACOUSTIC TRANSDUCER WITH MECHANICAL IMPEDANCE TRANSFORMER

BACKGROUND OF THE INVENTION

1. Field of the Invention

The present invention relates to an electroacoustic transducer provided with a mechanical impedance transformer, capable of emitting powerful acoustic waves in a liquid environment.

2. Description of the Prior Art

French Patent applications FR-A-2,667,518 and 2,678,390 describe electrohydraulic vibrating sources suited for working notably in wells where the vibrations generated by a piling of piezoelectric disks are applied to pads coupled with an underground formation by means of hydraulic jacks and connecting circuits. Selection of the sections of the jacks allows the obtaining of a mechanical amplitude impedance matching and an amplification of the amplitude of the vibrations applied to the ground by the pads.

U.S. Pat No.5,069,308 describes a source of acoustic waves suited for working in a well, which comprises a tubular body, an electromechanical generator consisting of one or two pilings of piezoelectric disks, coupled with a mechanical impedance transformer which lowers the acoustic impedance of the generator. The transformer comprises several flexible elongated blades arranged symmetrically around the central axis of the body. The central part of each blade has an elliptical curvature in a radial plane and it is connected at its opposite ends to two plates substantially perpendicular to the axis of the source, which rest on vibrating faces of the generator.

SUMMARY OF THE INVENTION

The electroacoustic transducer according to the invention comprises at least a vibration generator (comprising for example a piling of piezoelectric disks or of a magnetostrictive type motor, connected to a voltage source) arranged in an elongated body and an impedance transformer coupled mechanically with the generator.

On account of its dimensions, the transducer according to the invention is particularly well-suited for being used in wells of relatively small section such as petroleum or gas wells.

The impedance transformer comprises a tubular part or shell having at least a curved and flexible central part and at least a tubular part, the curved part at least being provided with openings (such as slits oriented along generating lines of the shell), the inner volume of the tubular part being selected for reinforcing the lowest frequencies generated by the vibration generator.

The vibration generator comprises for example a piling of sensitive elements that is extended at both ends by two end pieces or ferrules resting against end faces thereof and coupled therewith by a coupling means.

According to another embodiment, the transducer comprises a flexible housing arranged around the shell, for insulating the inner volume thereof from the outside environment, at least one ferrule being provided with openings allowing the volume to be filled with a fluid.

According to another embodiment, the tubular part is kept under stress with respect to the ferrules by two end caps secured respectively to the two ferrules.

According to another embodiment, the transducer comprises two sleeves extending on either side of the vibration generator and the shell, and connected by means of elastic decoupling elements (elastomer block, spring, etc).

According to another embodiment, each of the two sleeves comprises an inner wall and a plate secured to the wall by means of the elastic element, the plate being fastened against the end cap.

One of the two sleeves may comprise an end wall provided with sealed electric ducts and channels allowing passage of electric conductors connecting each of the sealed ducts to the generator.

The transducer can be used at depths in a well and comprises linking means allowing connection to a surface installation outside the well or on the water surface.

According to another embodiment, the transducer comprises static compensation means allowing a static compensation of the variations in the static pressure of the outside environment in which it is used.

The transducer can be connected for example to a surface installation (onshore or offshore for example) by linking means.

The transducer according to the invention is advantageous notably in that:

- the shell surrounding the vibration generator is made all in one piece, it is easier to manufacture and its acoustic characteristics are stable and more easily controllable; and
- with its openworked central part (or possibly each one of them) extending on one side at least by a solid cylindrical part, the shell forms a cavity resonator that has a higher acoustic efficiency for low frequencies side.

BRIEF DESCRIPTION OF THE DRAWINGS

Other features and advantages of the transducer according to the invention will be clear from reading the description hereafter of embodiments given by way of non limitative examples, with reference to the accompanying drawings in which:

FIG. 1 shows a longitudinal section of the transducer;

FIG. 2 shows a cross-section along section line 2—2 of the transducer, of FIG. 1;

FIG. 3 shows a variant of the embodiment of FIG. 1 provided with means for compensating the variations in the static pressure exerted externally to the transducer.

DESCRIPTION OF THE PREFERRED EMBODIMENTS

Figure 5:
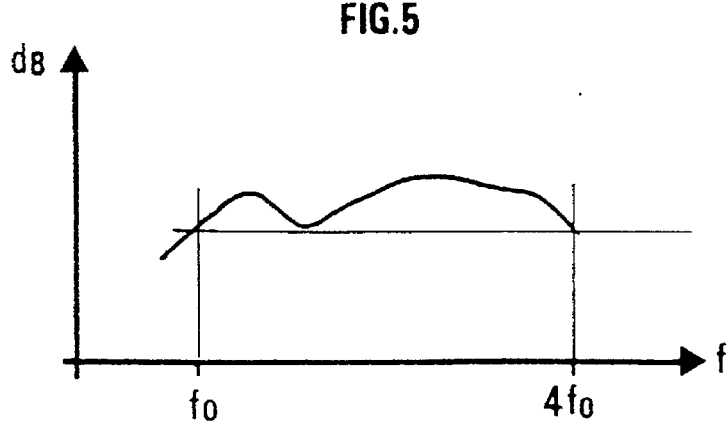
FIG. 5 shows an example of an emission spectrum that can be obtained with the transducer for a certain dimensioning type.

The transducer according to the invention comprises (FIGS. 1, 2) a vibration generator including for example a block 1 of sensitive elements comprising a piling of piezoelectric disks or of piezoelectric type tubes. Two cylindrical ferrules 2, 3 are respectively engage the opposite end faces of block 1. Each ferrule is provided with a central bore 4 and with an axial cavity 5, on the side opposite their face engaging block 1. A stud bolt 6 threaded at both ends runs through block 1 and the two ferrules 2, 3, and the assembly is joined together by hold-down nuts 7. The disks of the piling are kept under stress by the clamping means 6, 7.

A tubular part or shell 8, arranged round block 1 and the two ferrules 2, 3, comprises a curved median part 8A exhibiting a concavity directed towards the outside of the transducer, which is extended on either side by two cylindrical parts 8B, 8C provided each with an end plate 9. The length of block 1 extended with the two ferrules 2, 3 is greater than that of shell 8. An opening is provided in each of the two end plates 9. Its section is sufficient to allow passage of the end part of the corresponding ferrule 2, 3 that is externally threaded. Two caps 10 are screwed respectively onto ferrules 2, 3 so as to rest against plates 9 at the ends of shell 8 and to exert thereon a permanent prestress adjustable as a function of the vibration amplitude planned for the generator.

The tubular part or shell 8, at least in its curved central part 8A, is provided with one or several openings 11 that can be, for example, slits arranged along generating lines of the tubular part and symmetrically around the longitudinal axis of the block.

A stiff tubular sleeve 12, internally provided with a wall 13, is arranged at each end of the transducer. A decoupling element 14 such as an elastomer block or a spring is placed respectively between each of the walls 13 and a plate 15, and each assembly is joined together by an axial stud bolt 16. Screws (not shown) allow securing each of the plates 15 and consequently the two tubular sleeves 12 respectively to the two caps 10. The inside section of each sleeve 12 is substantially equal to the outside section of cap 10 and of the corresponding plate 15. Joints 17 are interposed between each sleeve and the corresponding cap, so as to provide a seal between them when they move with respect to one another on account of the length of variations undergone by each decoupling element 14.

A flexible membrane 18 is positioned over shell 8. Its length is sufficient to cover each tubular sleeve 12 over part of the length thereof. Fastening means (not shown) allow the ends of the flexible membrane 18 to be pressed against the outer wall of each sleeve 12.

A closing part 19 provided with an axial port 20 and externally with seals 21 is loated in the inner cavity of one of the sleeves 12 on the side of the wall 13 opposite the elastomer block 14. This closing part is kept in position by a ring 22. Two sealed ducts 23 arranged in the thickness of part 19 establish an electric connection between inner electric conductors 24 and outer pins 25, which are connected to an electric generator (not shown) delivering a high voltage (1 to 2 kV for example).

Channels 26 are provided in the thickness of wall 13, of plate 15 and of cap 10 for the passage of the electric conductors towards the sensitive piezoelectric elements allowing the excitation thereof.

A fluid, for example oil, is injected through the axial port 20 in order to fill the inner volume of the transducer.

The transducer according to the invention can be used for applications in wells or offshore applications for example, notably for underground seismic prospecting applications.

In the case where the transducer must be used in an environment where the outside pressure is likely to vary considerably (notably in a well), a variant such as that schematized in FIG. 3 is preferably used. According to this variant, one of the sleeves 12 for example is extended by an element DM containing a fluid in equipressure with the fluid inside the shell, and whose volume is deformable.

This deformable element DM is for example a bellows also filled with oil or a balancing cylinder of a well-known type communicating with the inside of shell 8 in which a piston provided with seals can move freely under the action of the pressure variations resulting for example from the vocation of the depth of the transducer in the environment in which it is used.

Figure 4:
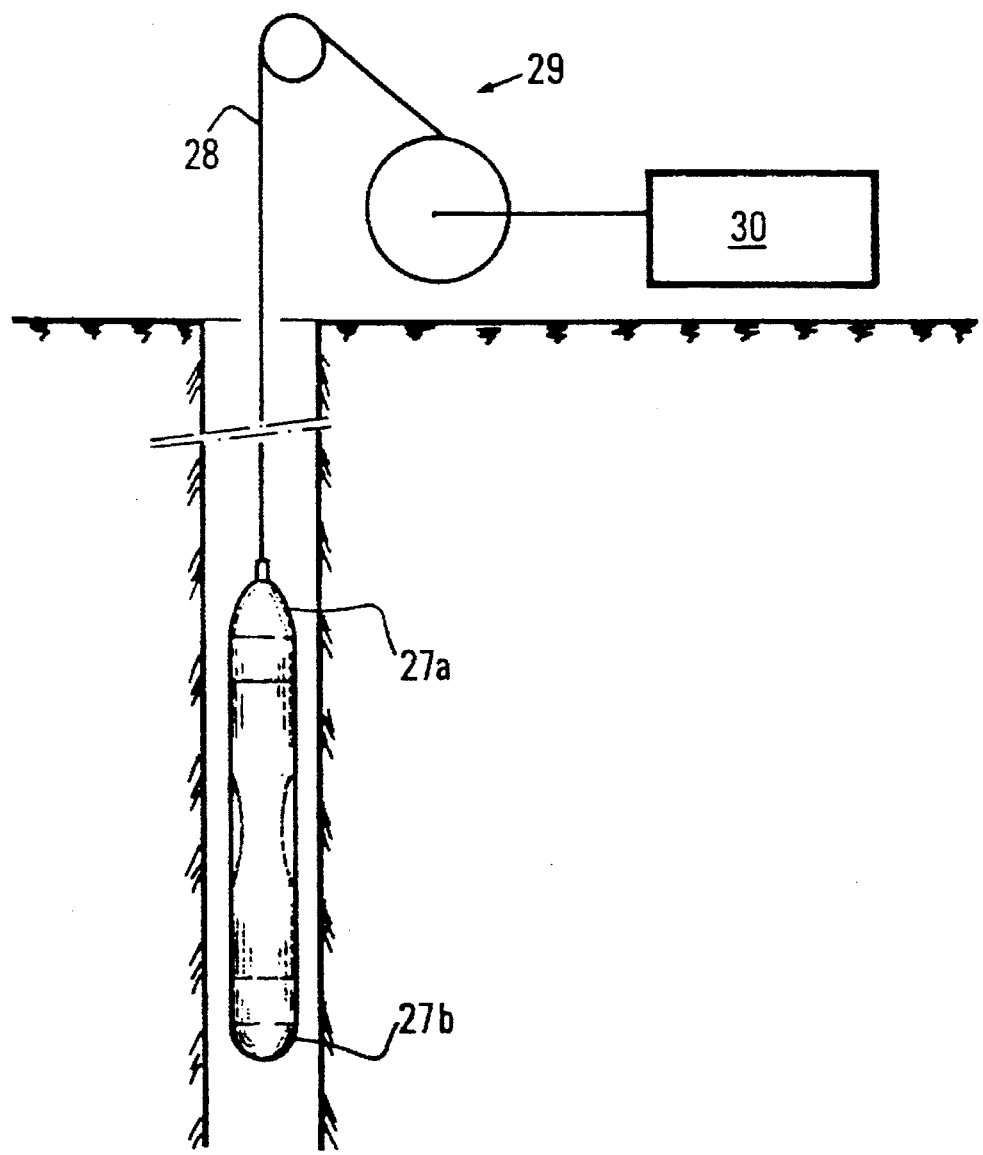
FIG. 4 shows the transducer modified for working in a well.

The transducer according to the invention can be used in a well (FIG. 4) for seismic prospecting applications in an underground formation. In this case, the two opposite sleeves are extended by rigid covers 27a, 27b. An electric carrying cable 28 linked internally to the inner electric conductors 24 is connected to the upper cover 27a and, at its opposite end, to a hoisting device 29 and to a variable voltage source 30 for applying an excitation signal to generator 1.

The frequency spectrum emitted by such a transducer (an example is shown in FIG. 5) depends on the specific emission band of the block of sensitive elements, but also on the inner volume of shell 8, on the length of the concave central part and on the total surface of the slits 11 provided therethrough.

These slits 11 serve as vents for the cavity resonator comprising of the shell and, according to the previous parameters, the emitted frequency spectrum, which can reach at least two octaves, and emit low frequencies.

The transducer according to the invention can work in environments whose temperature can reach 185° C. and whose pressure can exceed 100 MPa for example.

A transducer where the inside of the shell is insulated from the outside environment by a separation membrane 18 and where elastic decoupling means made of elastomer are used has been described. Without departing from the scope of the invention, the transducer can be used by allowing the external fluid to have free access to the inside of the cavity and by replacing the elastomer blocks by helical type springs for example.

We claim:

1. An electroacoustic transducer comprising at least a vibration generator for generating elastic waves in a frequency range and an impedance transformer mechanically coupled with the generator, including a tubular part located around the vibration generator, defining an inner volume, the tubular part having at least a curved and flexible tubular portion adjacent to at least a solid cylindrical portion, at least the curved tubular portion being provided with openings and an inner volume of the tubular part reinforcing by resonance lowest frequencies in the frequency range generated by the vibration generator.

2. A transducer as claimed in claim 1, wherein at least the curved tubular portion is provided with slits oriented substantially along a length of the tubular part.

3. A transducer as claimed in claim 1, wherein the curved flexible portion comprises a concave central part of the tubular part connected on either side with a cylindrical part.

4. A transducer as claimed in claim 1, wherein the vibration generator comprises a piling of transducer elements provided with two end faces extended at the ends thereof by two ferrules resting respectively against the two end faces thereof which extend the piling of transducer elements and coupling means for coupling respectively the ferrules to the piling of transducer elements.

5. A transducer as claimed in claim 4, comprising a flexible housing located around the tubular part for insulating the inner volume thereof from an outside environment, and at least one of the ferrules being provided with openings allowing the volume to be filled with a fluid.

6. A transducer as claimed in claim 5, further comprising two end caps secured respectively to the two ferrules, for keeping the tubular part under stress.

7. A transducer as claimed in claim 1, comprising two sleeves extending on either side of the vibration generator and the tubular part and elastic decoupling means for the two sleeves being connected through the elastic decoupling means.

8. A transducer as claimed in claim 7, wherein the elastic decoupling means comprise an elastic decoupling element, each of the two sleeves comprises an inner wall and a plate secured to the inner wall by means of the elastic decoupling element, and the plate is fastened against one of the end caps.

9. A transducer as claimed in claim 8, wherein one of the two sleeves comprises a end wall provided with sealed electrical ducts and channels allowing passage of electric conductors for feeding the vibration generator.

10. A transducer as claimed in claim 1, wherein the vibration generator comprises a piling of piezoelectric disks connected electrically to a voltage source and clamping means for keeping the piling under stress.

11. A transducer as claimed in claim 1, wherein the vibration generator comprises a magnetostrictive type emission unit connected electrically to a voltage source.

12. A transducer as claimed in claim 1, comprising linking means for connecting the transducer to a control station.

13. A transducer as claimed in claim 12, wherein the linking means includes an electrically conductive carrying cable for linking the transducer to an installation outside a well.

14. A transducer as claimed in claim 12, comprising linking elements allowing connection of the transducer to a control station at the water surface.

15. A transducer as claimed in claim 12, comprising static compensation means for adjusting static pressure inside the transducer when an outside static pressure varies.

16. A transducer as claimed in claim 8, wherein the elastic decoupling element comprises a block made of elastomer.

17. A transducer as claimed in claim 1, wherein the elastic decoupling element comprises a spring.

* * * * *